United States Patent
Kim et al.

(10) Patent No.: US 7,652,996 B2
(45) Date of Patent: Jan. 26, 2010

(54) METHOD FOR ADJUSTING TRANSMISSION RATE OF MPEG-2 DATA AND APPARATUS THEREFOR

(75) Inventors: Sang-Ho Kim, Suwon-si (KR); Jae-Hun Cho, Suwon-si (KR); Kyu-Hyung Cho, Bucheon-si (KR); Yun-Je Oh, Yongin-si (KR)

(73) Assignee: Samsung Electronics Co., Ltd., Yeongtong-Gu, Suwon-Si, Gyeonggi-Do (KR)

( * ) Notice: Subject to any disclaimer, the term of this patent is extended or adjusted under 35 U.S.C. 154(b) by 779 days.

(21) Appl. No.: 10/862,303

(22) Filed: Jun. 7, 2004

(65) Prior Publication Data

US 2005/0169181 A1 Aug. 4, 2005

(30) Foreign Application Priority Data

Feb. 4, 2004 (KR) .................... 10-2004-0007367

(51) Int. Cl.
- G01R 31/08 (2006.01)
- G06F 11/00 (2006.01)
- G08C 15/00 (2006.01)
- H04J 1/16 (2006.01)
- H04J 3/14 (2006.01)
- H04L 1/00 (2006.01)
- H04L 12/26 (2006.01)

(52) U.S. Cl. ........................ 370/235; 370/232
(58) Field of Classification Search ................ 370/232, 370/235, 473, 229, 252, 412, 517
See application file for complete search history.

(56) References Cited

U.S. PATENT DOCUMENTS

| | | | | |
|---|---|---|---|---|
| 5,566,174 A * | 10/1996 | Sato et al. | .................... | 370/468 |
| 5,640,338 A | 6/1997 | Jung | ........................... | 365/51 |
| 5,905,732 A | 5/1999 | Fimoff et al. | ............... | 370/516 |
| 6,580,694 B1 * | 6/2003 | Baker | ......................... | 370/252 |
| 6,680,907 B1 * | 1/2004 | Bonaventure | ............... | 370/229 |
| 6,792,000 B1 * | 9/2004 | Morinaga et al. | ........... | 370/473 |
| 2003/0126294 A1 | 7/2003 | Throsteinson et al. | | |

FOREIGN PATENT DOCUMENTS

| | | |
|---|---|---|
| EP | 1223689 A1 | 7/2002 |
| JP | 09-505433 | 5/1997 |
| JP | 2003-333488 | 11/2003 |
| WO | WO 02/41625 A1 | 5/2002 |
| WO | WO 2004/010670 | 1/2004 |

* cited by examiner

*Primary Examiner*—Kevin C Harper
*Assistant Examiner*—Leon Andrews
(74) *Attorney, Agent, or Firm*—Cha & Reiter, LLC

(57) ABSTRACT

An apparatus and a method for adjusting a transmission rate of data, in particular a moving picture experts group 2 (MPEG-2) data is disclosed The apparatus includes a receiving buffer for buffering multi program transport stream (MPTS) packets received at various transmission rates, and a packet storage for storing MPEG-2 null packets. A signal processing section reads data buffered in the receiving buffer at a predetermined output transmission rate, wherein the signal processing section stops an operation of reading data buffered in the receiving buffer, and reads and transmits the MPEG-2 null packets stored in the packet storage when a predetermined underflow occurrence forecast situation is caused in the receiving buffer.

18 Claims, 6 Drawing Sheets

METHOD FOR ADJUSTING TRANSMISSION RATE OF MPEG-2 DATA AND APPARATUS THEREFOR

CLAIM OF PRIORITY

This application claims priority to an application entitled "Method for adjusting transmission rate of MPEG-2 data and apparatus therefor" filed in the Korean Intellectual Property Office on Feb. 4, 2004 and assigned Serial No. 2004-7367, the contents of which are hereby incorporated by reference.

BACKGROUND OF THE INVENTION

1. Field of the Invention

The present invention relates to a technique for adjusting a transmission rate of, for example, Moving Picture Experts Group-2 (MPEG-2) data. More particularly, the present invention relates to a method and an apparatus for adjusting a transmission rate of MPEG-2 data, in which the data is being output at a constant output transmission rate that is maintained despite receiving input MPEG-2 data at various input transmission rates, the recovery of data without any information regarding clock data recovery (CDR).

2. Description of the Related Art

An MPEG-2 system is adapted for two particular types of multiplexed bit streams, namely a program stream and a transport stream. With regard to these two streams, a program stream is utilized for a multiplexing method either which is applied when one broadcast program including video, audio, and captions is used in an error-free channel environment or when an error correction function of a medium's own is used in tact, as in a compact disks CD or DVD's. A transport stream is utilized for a multiplexing method used when several broadcast programs are simultaneously transmitted in a channel environment having that is not error free. In other words, the program stream is used for storing one program, such as a video CD, and the transport stream is used for digital broadcasting of a plurality of programs by means of an artificial satellite.

The MPEG-2 system employs a packet multiplexing method, which has been previously used in a time division multiplexing (TDM) method. Herein, each of video and audio bit streams is first divided into packetized elementary streams (hereinafter, referred to as 'PESs') called packets having an appropriate length (in terms of kbytes). Each of the PES packets has an agreed to length limitation of no more than 64 kilobytes maximum, so as to be to communicate with various applications, and may take any one of a fixed length and a variable length. Also, each PES packet may be transmitted either at a variable transmission rate or intermittently. The program stream and the transport stream are made by multiplexing each PES into one bit stream.

A length of a packet depends largely upon the transmission channel or the medium used. For example, in an asynchronous transfer mode (ATM), which is a protocol for a broadband integrated services digital network (BISDN), packet cells of 53 bytes are used. In such a packet cell, since a header for containing basic information occupies 5 bytes, actual information (payload) for a user is contained within 48 bytes. The transport stream packets (hereinafter, simply referred to as "transport packets") have a comparatively short fixed length of 188 bytes in consideration of connectivity to the ATM. In the transport packet, the first 4 bytes make up a header, and 184 bytes are a portion for user information carrying video or audio data. Such a transport packet is carried in 4 ATM cells and is transmitted. At this time, one byte of the 48 bytes for user information in each ATM cell is used for an ATM adaptation layer (AAL), and thus actual user information is contained in 47 bytes.

The transport packets, which have been first multiplexed and transmitted from each broadcasting station, are re-multiplexed to construct one bit stream, thereby being arranged in a form that can be transmitted through one repeater. Multiplexing of digital satellite broadcasting includes time division multiplexing (TDM) and frequency division multiplexing (FDM). In other words, repeaters have a bandwidth of 27 MHz and are managed in a form of the FDM, but 4 broadcasting stations share the repeaters in the TDM method. The transport stream to be carried to each repeater then undergoes a Reed-Solomon coding and a convolutional coding, and is transmitted between a ground station and a satellite by a quadrature phase shift keying (QPSK) modulation.

A decoding of the transport stream by a receiving terminal is performed with a reverse process to above-mentioned process. First, the receiving terminal selects a repeater including a broadcast to be desired by a user of the receiving terminal, then the terminal performs a QPSK demodulation of a signal input through the repeater, and corrects the error. The repeater outputs a bit stream in which several broadcasts are multiplexed. Therefore, the receiving terminal first chooses transport packets of only a broadcasting station which is desired to be received, decodes video packets from among the chosen transport packets with a video decoder, and audio packets from among the chosen transport packets with an audio decoder, respectively, thereby reproducing video and audio.

Recently, the transmission of video data through broadband communication systems, such as a cable TV, a satellite TV network, etc., has become extremely popular. With such a video data transmission, a source video sequence is encoded either after compression (or without compression) to form transport streams, and then may be transmitted at a proper constant bit rate (CBR) or at a variable bit rate (VBR). However, for various applications, before communication is performed to a set-top box (STB) and/or intermediate nodes of a network, an apparatus for varying a transmission rate of video data is necessary. Therefore, an apparatus capable of processing all of the video data of various transmission rates can be contained in the set-top box or the like, but this construction is far from being desirable in terms of the cost and such an apparatus has a complex construction.

In addition, in order to vary a transmission rate of MPEG-2 data, the use of a REMUX or the like having a comparatively high price is required. Moreover, even with a digital video broadcast asynchronous serial interface (DAB-ASI) as a widely-used transmission method for the transmission of MPEG-2, it is impossible to know the actual transmission rate of data, as only an interface clock of the DVB-ASI can be extracted. Therefore, clock information of the DVB-ASI is also used as clock information of the data, so that an underflow or an overflow may occur in a buffer of a receiving section, wherein the received data are stored in a buffer, such as an FIFO (First In First Out), and subsequently transmitted. For example, when the difference between an actual data rate and the clock information is 1 ppm on the basis of 27 Mbps, either an underflow or an overflow occurs once per approximately 330 seconds. Also, when the difference is 2 ppm on the basis of 27 Mbps, either an underflow or an overflow occurs once per approximately 165 seconds (330/2=165). Therefore, there is a need in the art to provide efficient transmission the MPEG-2 data and prevent the problematic data losses caused by clock mismatches between a transmission time and a receipt time when the MPEG-2 data are transmitted.

SUMMARY OF THE INVENTION

Accordingly, the present invention has been made to solve at least some of the above-mentioned problems. An aspect of the present invention is to provide a method and an apparatus for adjusting a transmission rate of data according to protocols such as MPEG-2 data at a lower cost.

Another aspect of the present invention is to provide a method and an apparatus for preventing either or both of an underflow and an overflow from occurring in a buffer of a receiving section and for the efficient transmission of MPEG-2 data when receiving and then transmitting such MPEG-2 data.

To accomplish the above and other aspects, there is provided an apparatus for adjusting a transmission rate of moving picture experts group 2 (MPEG-2) data, the apparatus comprising: a receiving buffer for buffering multi-program transport stream (MPTS) packets received at various transmission rates; a packet storage for storing MPEG-2 null packets; and a signal processing section for reading data buffered in the receiving buffer at a predetermined output transmission rate, wherein the signal processing section stops an operation of reading data buffered in the receiving buffer, and reads and transmits the MPEG-2 null packets stored in the packet storage when a predetermined underflow occurrence forecast situation is caused in the receiving buffer.

In accordance with another aspect of the present invention, there is provided a method for adjusting a transmission rate of moving picture experts group 2 (MPEG-2 ) data, in which multi program transport stream (MPTS) packets input at various transmission rates are received and the MPTS data are transmitted at a predetermined output transmission rate, the method including: a) reading and transmitting buffered data at the output transmission rate when a current buffered data point (CF) reaches a predetermined data output point (HF) in a receiving buffer which receives the inputted MPST packets; b) stopping the reading of data buffered in the receiving buffer and transmitting MPEG-2 null packets at the output transmission rate when the current buffered data point (CF) reaches a predetermined underflow forecast point (QF) in the process of reading the buffered data; and c) reading and transmitting buffered data at the output transmission rate and then proceeding with step b) when the current buffered data point (CF) reaches the data output point (HF) in the process of transmitting the null packets.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION

Hereinafter, a method for adjusting a transmission rate of MPEG-2 data and an apparatus therefor according to the present invention will be described with reference to the accompanying drawings. In the following description of the present invention, a detailed description of known functions and configurations incorporated herein will be omitted when it may obscure the subject matter of the present invention.

Figure 1:
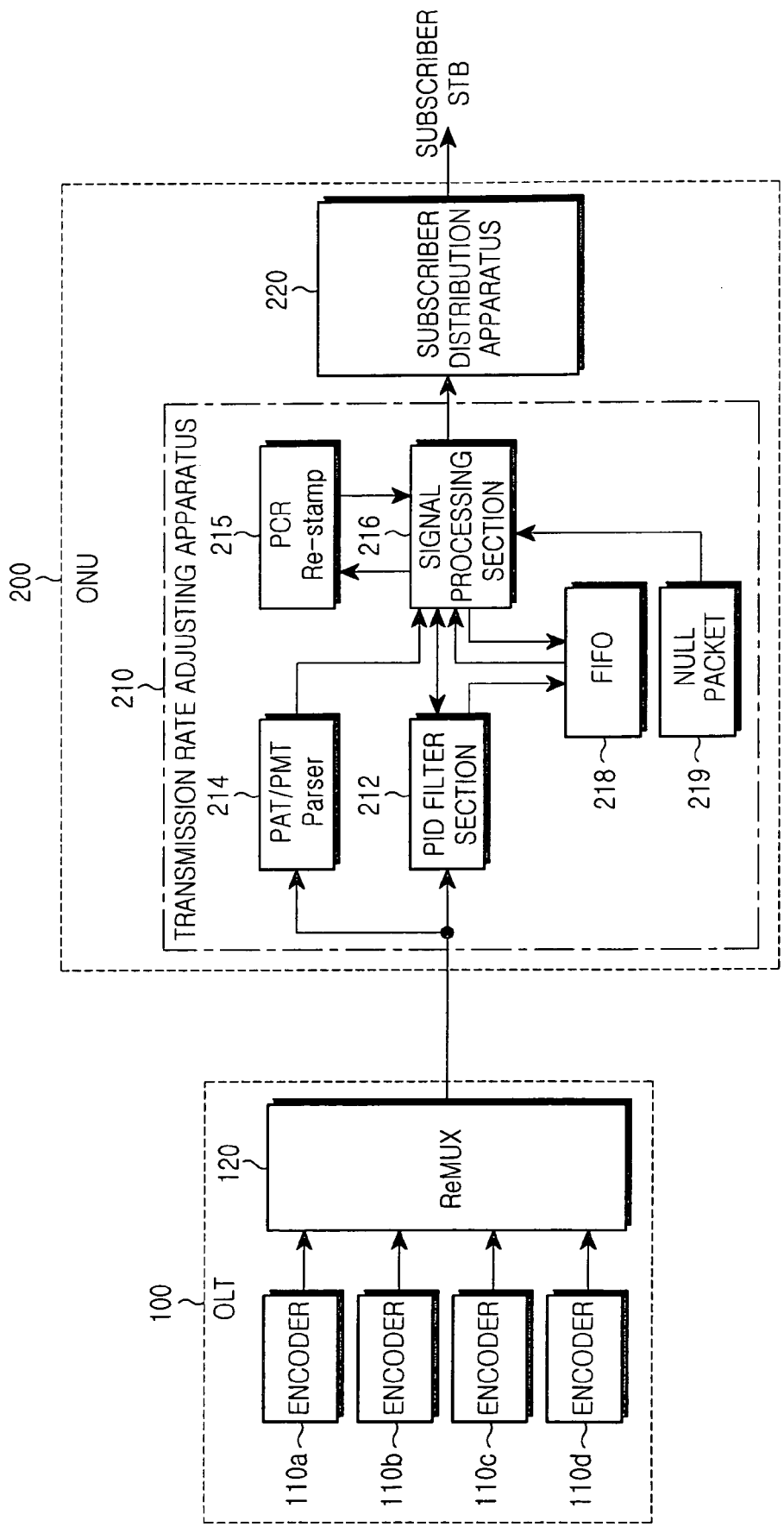
FIG. 1 is a block diagram schematically illustrating an apparatus for adjusting a transmission rate of MPEG-2 data according to a first aspect of the present invention and a relevant system.

FIG. 1 is a block diagram schematically illustrating an apparatus for adjusting a transmission rate of MPEG-2 data according to a first aspect of the present invention and a relevant system. Referring to FIG. 1, an MPEG-2 data transmitting system may include an optical line terminal (hereinafter, referred to as "OLT") 100 and an optical network unit (hereinafter, referred to as "ONU") 200. The OLT 100 multiplexes broadcasting data having been transmitted from a plurality of broadcast providers, such as broadcasting stations, and then transmits the multiplexed data through a transmission medium (optical fiber) in order to provide broadcast services to the subscribers. The ONU 200 is a unit of a user side for transmitting information, which has been received from the OLT 100, to a user's set-top box (STB). When broadcasting data transmitted from a broadcast service provider is transmitted to the ONU 200 through the OLT 100, the ONU 200 receives a service request from a set-top box for a service user and transmits the broadcasting data by a time division multiplexing (TDM) method.

In the OLT 100, each encoder 100a to 100d encodes transport packets primarily multiplexed in and output from a broadcasting station, and a ReMUX 120 constructs and outputs a multi-program transport stream (hereinafter, referred to as "MPTS") by re-multiplexing the encoded data. The ONU 200 includes a transmission rate adjusting apparatus 210 and a subscriber distribution apparatus 220. The transmission rate adjusting apparatus 210 receives the MPTS transmitted from the OLT 100 and controls a transmission rate so that the MPTS can be transmitted to the user's set-top box at a predetermined constant transmission rate. The subscriber distribution apparatus 220 transmits a bit stream, which has been output from the transmission rate adjusting apparatus 210, to each user's set-top box.

The transmission rate adjusting apparatus 210 includes a PAT/PMT analyzer 214, a signal processing section 216, a program identification (hereinafter, referred to as "PID") filter section 212, a receiving buffer (FIFO) 218, a Null packet storage 219, and a program clock reference (hereinafter, referred to as "PCR") information storage 215. The PAT/PMT analyzer 214 analyzes transport packets (PID=0x0000) including a program association table (hereinafter, referred to as "PAT") and transport packets including a program map table (hereinafter, referred to as "PMT") of the respective programs from input MPTS packets, and outputs information thereof. The signal processing section 216 receives information output from the PAT/PMT analyzer 214, confirms PID information of a PCR packet, and controls an operation of the PID filter section 212 according to the result of the confirmation. The PID filter section 212 confirms a relevant PID of a MPTS packet input under the control of a signal processing section 216, and provides the confirmed information to the signal processing section 216. The receiving buffer (FIFO) 218 buffers an input MPTS packet, and provides the packets in sequence to the signal processing section 216 that are identified as the packets buffered under the control of the signal processing section 216. The packet storage 219 stores null packets (PID=0x1FFF), and the PCR information storage 215 stores PCR information.

According to this aspect of the invention, a rate at which the signal processing section 216 reads data buffered in the receiving buffer 218 is set to a value that is equal to or faster than a rate of data input into the receiving buffer 218. Therefore, the receiving buffer 218 always forms a situation in which underflow may occur. The signal processing section 216 stops an operation of reading data buffered in the receiving buffer 218 at a proper time before the underflow occurs in the receiving buffer 218, and reads and transmits the MPEG-2 null packets stored in the packet storage 219. At this time, the signal processing section 216 analyzes PCR information and properly controls a buffering size of the receiving buffer 218 according to the result of the analysis.

In other words, the signal processing section 216 monitors a current state of the receiving buffer 218 and the length of a packet read by the signal processing section 216, and selects and reads the packet storage 219 storing the null packets and the receiving buffer 218 storing actual MPEG-2 data. An MPEG-2 decoder of the user's set-top box receives transport streams in which the null packets are inserted then selects and stores packets of only an audio PID, a video PID, and a text PID, and removes packets of PID (1x1FFF) representing a null packet, so that the user's set-top box of the present invention is no different from that of the prior art.

By the construction and the operation as described above, in a case of transmitting data at a constant bit rate (CBR) (for example, 27 Mbps) that is predetermined in accordance with the user's set-top box, when receiving MPEG-2 data at a lower bit rate (for example, 9 Mbps) than the predetermined constant bit rate from the OLT 100, the transmission rate adjusting apparatus 210 transmits data at a bit rate identical to the predetermined constant bit rate (27 Mbps) by inserting the null packets, so that a transmission rate to the user's set-top box is constantly maintained (without underflow issues). As described above, the transmission rate adjusting apparatus 210 according to this aspect of the invention stably transmits all MPEG-2 data which are inputted at a lower bit rate than the predetermined constant bit rate without clock data recovery (CDR).

Hereinafter, an operation of setting a size of the receiving buffer 218 and confirming underflow will be described in more detail. The length of a MPEG-2 packet (according to the current standard) may be two different sizes, either 188 bytes, or 204 bytes with a RS (Reed-Solomon) code added. In the process of reading such a packet, it is forecasted and confirmed whether or not underflow has occurred in the receiving buffer 218. When an underflow occurrence is forecasted, a reading process is stopped and the null packets are inserted. As a result, currently transmitted data are cut without a whole packet having been transmitted, and thereby an error may occur. Therefore, it is necessary to ensure that the receiving buffer 218 has a size of 204 bytes or more, and a null packet has to be inserted after a whole packet has been transmitted. Similarly, 204 bytes or more are additionally required when it is desired to transmit actual data again in the process of transmitting the null packet. Consequently, the size of the receiving buffer 218 must be 408 bytes or more.

Figure 2:
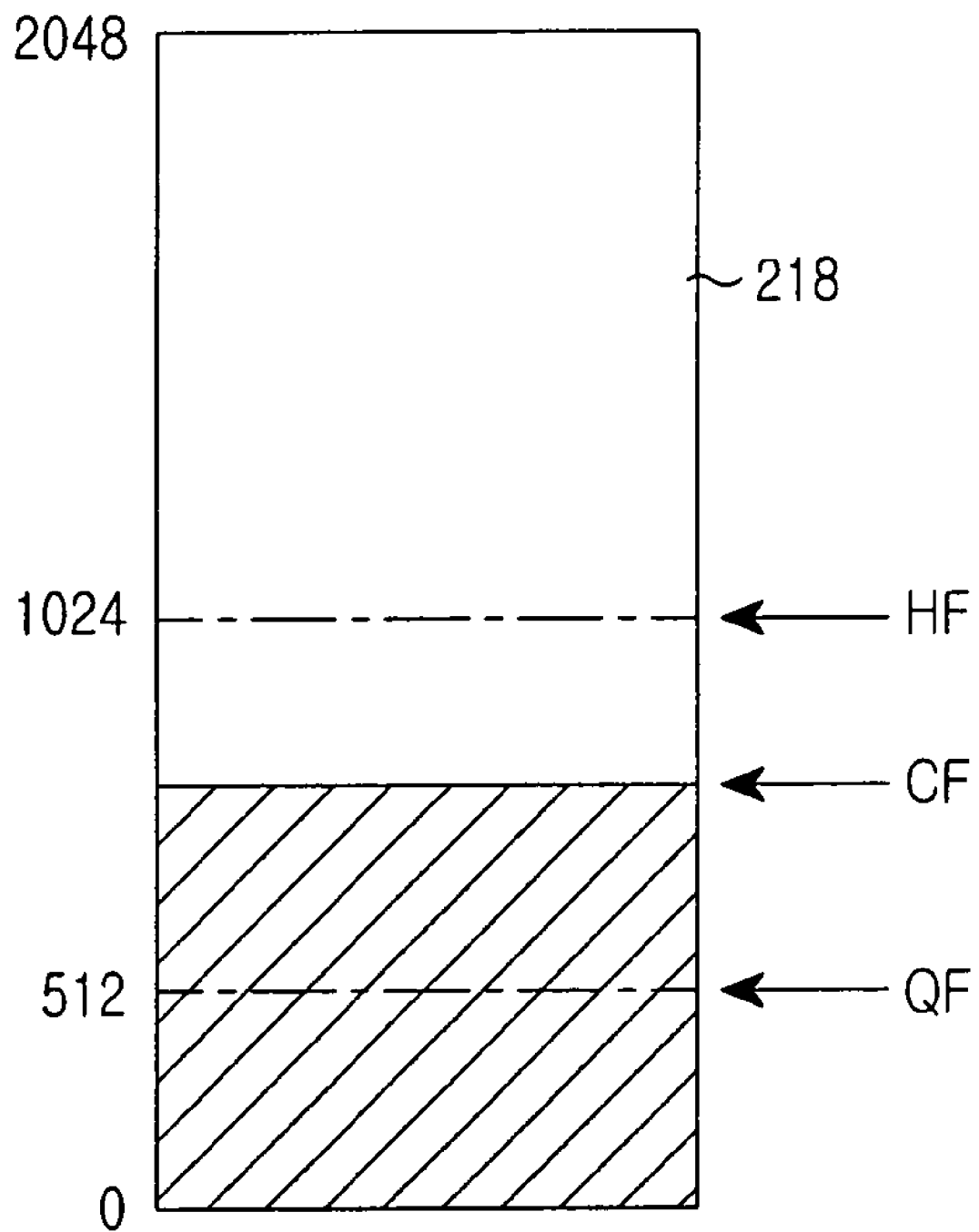
FIG. 2 is a view showing an example of a format for a receiving buffer shown in FIG. 1.

Referring to FIG. 2 showing an example of a construction format of the receiving buffer 218, the size of the receiving buffer 218 is set as 2048 bytes, and the signal processing section 216 starts to read buffered data as soon as the data are buffered up to a predetermined data output point (HF), that is, up to a point of 1024 bytes, as in FIG. 2. At this time, since a data-reading rate has been set to be faster than a data-recording rate, the amount of data buffered in the receiving buffer 218 is gradually reduced. When the amount of the buffer data reaches a predetermined underflow forecast point (QF), 512 bytes, the signal processing section 216 completes the transmission of the packet currently in progress, stops reading data buffered in the receiving buffer 218, and inserts the null packets. During the insertion of the null packet, data are buffered to be again stacked in the receiving buffer 218. Subsequently, when a current buffered data point (CF) reaches the data output point (HF), the signal processing section 216 completes the transmission of the null packet currently in progress, and again starts to transmit data buffered in the receiving buffer 218. Data are transmitted by repeatedly performing such operations.

Figure 3:
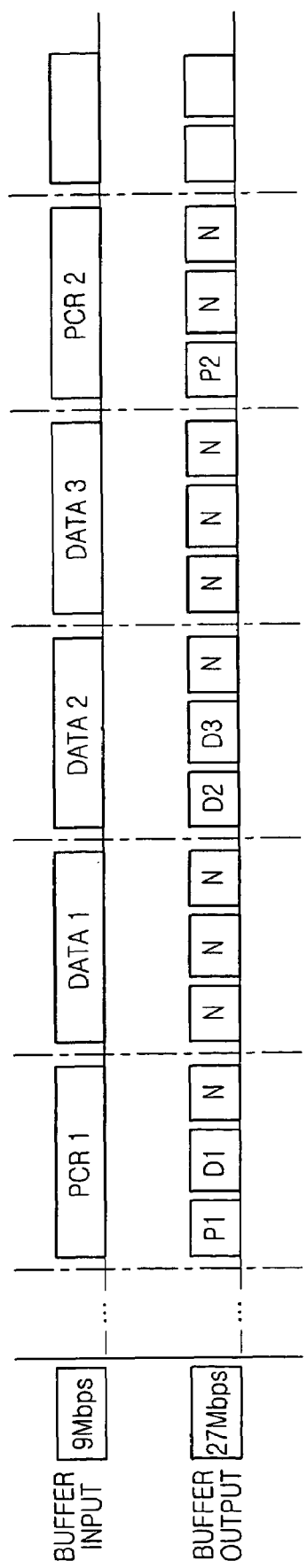
FIG. 3 is a view showing input and output states of data buffered in the receiving buffer shown in FIG. 1.

FIG. 3 is a view showing input and output states of data buffered in the receiving buffer 218 shown in FIG. 1 according to an aspect of the present invention. In FIG. 3, it is shown that packets are input and buffered in the receiving buffer 218 at 9 Mbps, and are output from the receiving buffer 218 at 27 Mbps. In other words, in this case, the data output rate is three times as fast as the data input rate. Referring to FIG. 3, while 5 packets PCR1, DATA1, DATA2, DATA3, and DATA 4 are input and buffered in the receiving buffer 218, 15 packets are output from the receiving buffer 218 with 10 null packets N.

Meanwhile, when MPEG-2 data are transmitted, PCR packets are transmitted at a predetermined time period, for example, 40 ms or 100 ms, for program synchronization so as to reduce the risk of interference between a transmitting terminal and a receiving terminal. Therefore, when data are transmitted with null packets inserted into the data according to a characteristic of the present invention, there is a problem in that the time period between PCR packets may drift beyond a tolerable limit value. So, the apparatus of the present invention confirms a time period between PCR packets transmitted with a MPTS which is currently transmitted, and controls the buffering size of the receiving buffer 218 according to the result of the confirmation. Such a control will be described in more detail with reference to FIG. 4.

Figure 4:
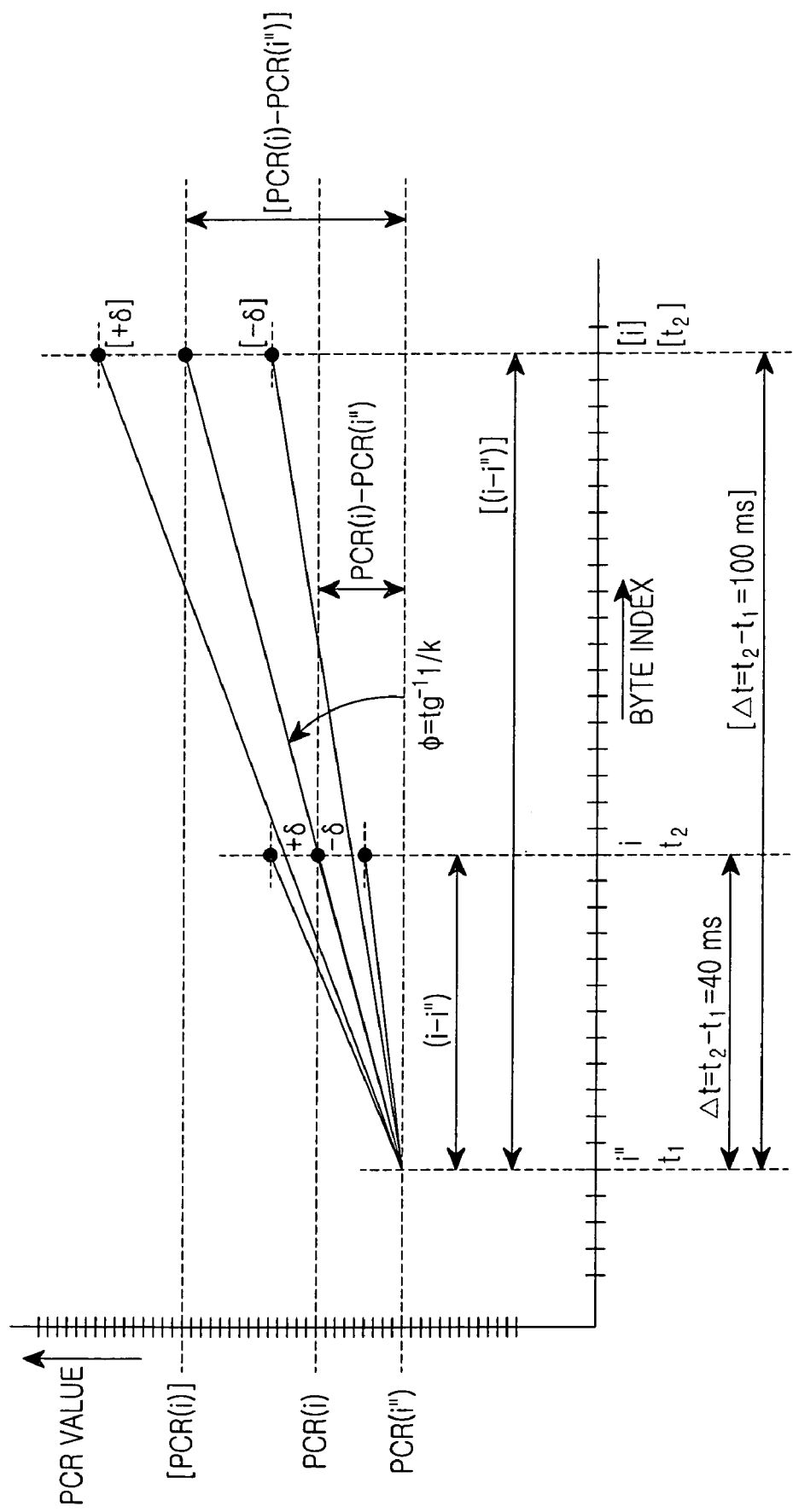
FIG. 4 is a graph for explaining a tolerable input timing limit between PCR (Program Clock Reference) packets for allocating a buffering region in the receiving buffer shown in FIG. 1.

FIG. 4 is a graph for explaining a tolerable input timing limit between PCR packets for allocating a buffering region in the receiving buffer 218 shown in FIG. 1 according to an embodiment of the present invention. FIG. 4 shows tolerable input timing between PCR packets i and i" with respect to a case in which a time period ($\Delta t$) between PCR packets is 40 ms and a case in which a time period ($\Delta t$) between PCR packets is 100 ms. The case in which a time period ($\Delta t$) between PCR packets is 100 ms is represented with square brackets ([ ]). Referring to FIG. 4, all PCR packets satisfying a value of 'k' in the following equation 1 must be input.

$$\frac{(i - i'')}{PCR(i) - PCR(i'') + \delta} \le k \le \frac{(i - i'')}{PCR(i) - PCR(i'') - \delta} \qquad \text{Equation 1}$$

According to equation 1, the PCR packets must be input while satisfying a range of '$-\delta$ to $+\delta$' on the graph shown in FIG. 4. When such a range is calculated according to the following equations 2 and 3, it can be understood that tolerance is approximately $-2.197$ usec to $+2.197$ usec in the case in which a time period ($\Delta t$) between PCR packets is 40 ms, and tolerance is approximately −3.996 usec to +3.994 usec in the case in which a time period (Δt) between PCR packets is 100 ms.

If: $\Delta t = t_2 - t_1 \approx 40$ ms $PCR(i) - PCR(i'') \approx 1080000$ clock pulses $[PCR(i) - PCR(i'')]/27 \times 10^6 \approx 1/25$ $[PCR(i) - PCR(i'')]^2/(27 \times 10^6)^2 \approx 1/625$ $\delta \approx 27 + 32.4 + 60 \times 10^{-6} \approx 59.4$ clock counts    Equation 2

If: $\Delta t = t_2 - t_1 \approx 100$ ms $PCR(i) - PCR(i'') \approx 27 \times 10^5$ clock pulses $[PCR(i) - PCR(i'')]/27 \times 10^6 \approx 0.1$ $[PCR(i) - PCR(i'')]^2/(27 \times 10^6)^2 \approx 0.01$ $\delta \approx 27 + 81 + 3.75 \times 10^{-6} \approx 108$ clock counts    Equation 3

As described above, the apparatus of the present invention confirms a time period of the PCR packets, and changes the buffering size of the receiving buffer 218 so that the time period of the PCR packets may not get out of the tolerable limit value. To this end, the apparatus of this aspect appropriately changes the underflow forecast point (QF) in the receiving buffer 218. In other words, in a case in which a time period of the PCR packets is long, the underflow forecast point (QF) is adjusted to appropriately become lower, so that the size between the data output point (HF) and the underflow forecast point (QF) in the receiving buffer 218 is adjusted to appropriately become larger according to the equations.

Figure 5:
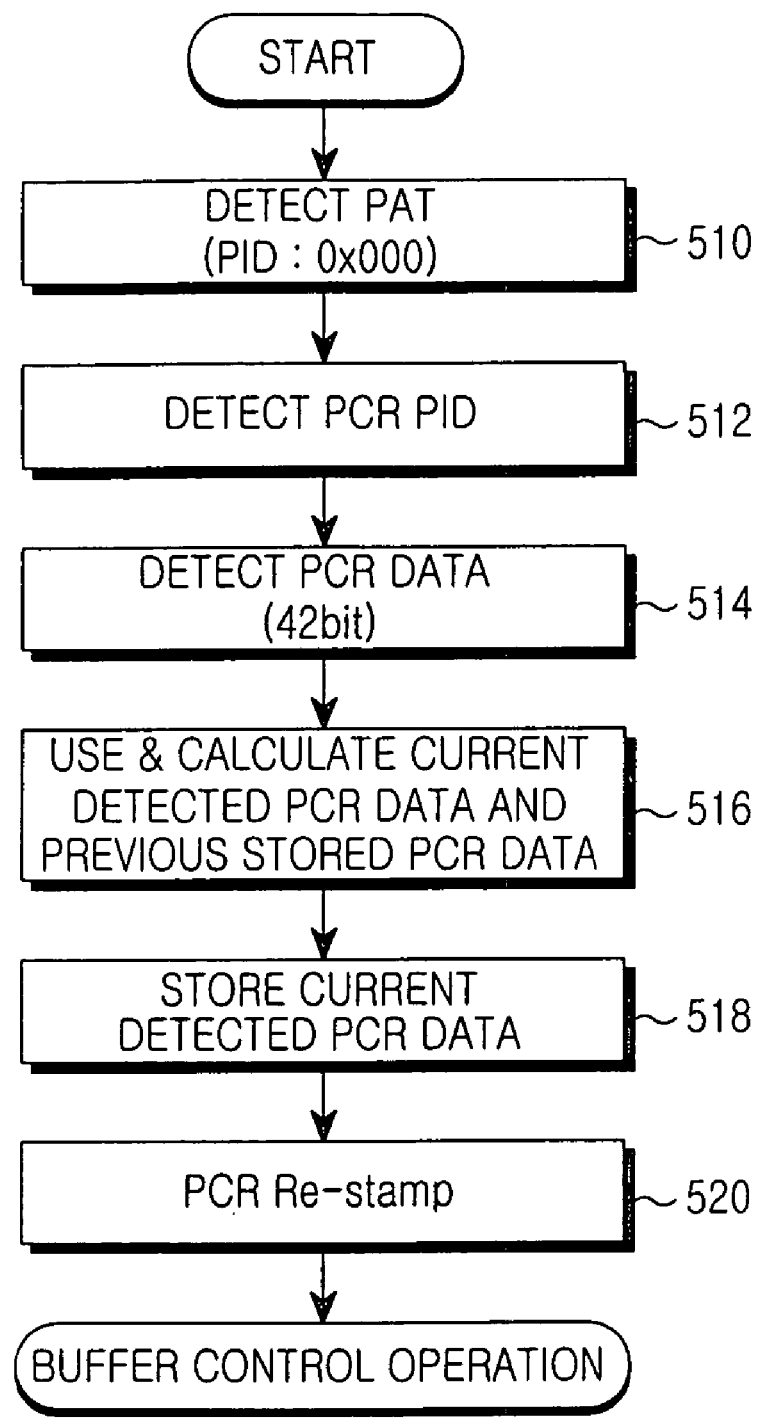
FIG. 5 is a flowchart for explaining operations for detecting a PCR packet and for setting a stamp according to the present invention.

FIG. 5 is a flowchart for explaining operations for detecting a PCR packet and for setting a stamp in the transmission rate adjusting apparatus 210 according to an aspect of the present invention. Referring to FIG. 5, first, a PAT and a PMT is detected from an input MPTS (step 510). After this, a PCR PID is detected from the detected PAT and PMT (step 512), and then PCR data are detected by confirming a packet of a relevant PCR PID (step 514). Subsequently, at step 516, a tolerable input value between PCR packets as shown in FIG. 4, that is, a value of 'δ' is calculated by the current detected PCR data and previous stored PCR data, and then the current detected PCR data are stored so as to be used for comparison and calculation when next PCR data are detected (step 518). After this, at step 520, a PCR re-stamp operation is performed according to the calculated tolerable input value between the PCR packets, and the underflow forecast point (QF) of the receiving buffer 218 is properly set as shown in FIG. 2. The steps 514, 516, and 518 may be repeatedly performed two or three times, so that an input period and a tolerable input value between the PCR packets can be calculated on an average, respectively. Similarly, at step 520, the PCR re-stamp operation may be set according to the average of input periods and the average of tolerable input values calculated in this manner. According to such a PCR re-stamp operation, a buffer control operation as shown in FIG. 6 is again initiated to be operated.

Figure 6:
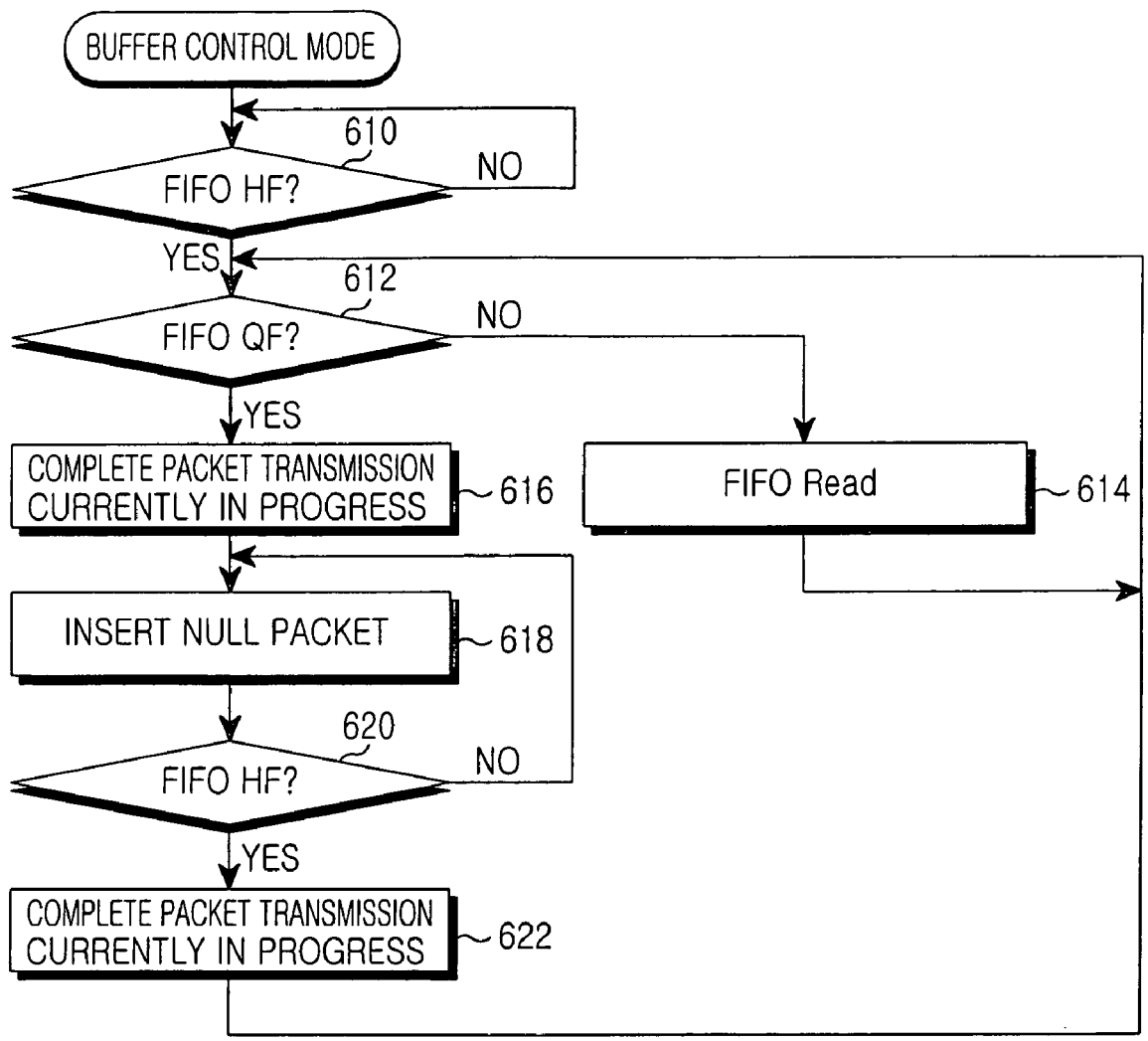
FIG. 6 is a flowchart for explaining an operation of transmitting transport packets input in the receiving buffer shown in FIG. 1 in order to adjust a transmission rate of the MPEG-2 data according to an aspect of the present invention.

FIG. 6 is a flowchart for explaining an operation of transmitting transport packets inputted in the receiving buffer 218 shown in FIG. 1 in order to adjust a transmission rate of the MPEG-2 data according to an aspect of the present invention, which will be described with reference to FIG. 3 showing input and output states of data buffered in the receiving buffer 218. At an initial buffer control operation, a standby state is maintained till data are buffered to the data output point (HF) of the receiving buffer 218 as at step 610 of FIG. 6, and when data are buffered to the data output point (HF) of the receiving buffer 218, step 612 is performed. At step 612, it is confirmed whether or not the current buffered data point (CF) of the receiving buffer 218 has reached the underflow forecast point (QF), and if it has not, step 614 is performed to start reading the buffered data at a rate of 27 Mbps. After this, the above-mentioned processes from step 612 are repeatedly performed. In performing such an operation, at step 612, it is confirmed that the current buffered data point (CF) of the receiving buffer 218 has reached the underflow forecast point (QF), step 616 is performed. At step 616, the transmission of packet currently in progress is completed. After this, an operation of reading data buffered in the receiving buffer 218 is stopped, and the null packet is inserted for transmission (step 618). Subsequently, at step 620, it is confirmed whether or not the current buffered data point (CF) of the receiving buffer 218 has reached the data output point (HF), and if the current buffered data point (CF) of the receiving buffer 218 does not reach the data output point (HF), the above-mentioned processes from step 618 are repeatedly performed. In such an operation process, at step 620, it is confirmed whether the current buffered data point (CF) of the receiving buffer 218 has reached the data output point (HF), step 622 is performed. At step 622, the transmission of packet currently in progress is completed, and then the above-mentioned processes from step 612 are repeatedly performed.

Hereinafter, the above-mentioned operations will be described in more detail with reference to FIG. 3. As shown in FIG. 3, a rate of the packets input to the receiving buffer 218 is 9 Mbps, and a rate of the packets outputted from the receiving buffer 218 is 27 Mbps. In the receiving buffer 218, it is assumed that the current buffered data point (CF) reaches the data output point (HF) when 3 packets are buffered, and the current buffered data point (CF) reaches the underflow forecast point (QF) when one packet and a half are buffered.

Therefore, when 3 packets are initially buffered in the receiving buffer 218 at the rate of 9 Mbps, the initial rate of reading the buffered data is at the rate of 27 Mbps, so that a first packet (P1, assuming that it is a PCR packet) is transmitted. After this, the current buffered data point (CF) of the receiving buffer 218 does not reach the underflow forecast point (QF), a second buffered packet (D1) is transmitted. At this time, while the second buffered packet (D1) is being transmitted, the current buffered data point (CF) of the receiving buffer 218 reaches the underflow forecast point (QF), but the transmission of the packet (D1) currently in progress is first completed. After this completion, the current buffered data point (CF) of the receiving buffer 218 has already reached (exceeds) the underflow forecast point (QF), the operation of reading buffered data in the receiving buffer 218 is stopped, and the null packet is transmitted. Referring to FIG. 3, while the first packet (P1), the second packet (D1), and 4 null packets are transmitted, 2 packets are input into the receiving buffer 218, so that the current buffered data point (CF) of the receiving buffer 218 reaches the data output point (HF). Therefore, a third packet (D2) is transmitted. After the third packet is transmitted, the current buffered data point (CF) of the receiving buffer 218 does not reach the underflow forecast point (QF), a fourth packet (D3) is transmitted. At the time that the fourth packet is transmitted, while the fourth buffered packet (D3) is being transmitted, the current buffered data point (CF) of the receiving buffer 218 reaches the underflow forecast point (QF), but the transmission of the packet (D3) currently in progress is first completed. After the transmission of the packet (D3) is completed, as the current buffered data point (CF) of the receiving buffer 218 already reaches, or even exceeds, the underflow forecast point (QF), and an operation of reading data buffered in the receiving buffer 218 is stopped, so that the null packet is transmitted. Referring to FIG. 3, after this transmission of the null packet, while 4 null packets are transmitted, the current buffered data point (CF) of the receiving buffer 218 reaches the data output point (HF), so that a fifth packet (P2) is then transmitted.

As described above, in the method of adjusting a transmission rate of the transport packets according to the present invention, it is possible to transmit the transport packets at a constant output transmission rate by controlling only a buffer, and not by using clock data recovery (CDR), in which the transport packets have various input transmission rates. Therefore, according to the method of adjusting a transmission rate of the transport packets, it is possible to receive all input data which have a transmission rate equal to or lower than a data reading rate in the receiving terminal (user's set-top box). In other words, the transmission rate is equal to or lower than the constant output transmission rate. In this case, since the MPEG-2 decoder of the receiving terminal removes the null packets and processes original data packets, the data can be recovered without any problem although the null packets are inserted at the transmitting terminal. Accordingly, even if the data transmission rate increases by the insertion of the null packets, the MPEG-2 decoder recognizes input data at an original data transmission rate.

According to the present invention described above, the method of adjusting a transmission rate of MPEG-2 data is achieved by using only a buffer control method, so that the transmission rate of the MPEG-2 data can be adjusted at a lower costs than known heretofore. Particularly, according to the present invention, when the MPEG-2 data are received and then transmitted, it is prevented that underflow or overflow occur in the buffer of the receiving section, so that the MPEG-2 data can be efficiently transmitted.

While the invention has been shown and described with reference to certain aspects thereof, it will be understood by those skilled in the art that various changes in form and details may be made therein without departing from the spirit and scope of the invention as defined by the appended claims.

For example, while MPEG-2 is identified in the specification as a protocol suited for this invention, the invention can be applied to other versions of MPEG, and/or to any communication protocol having variable input rates but is configured to have a general output rate and/or suffer from clock mismatch based on too large of a difference between transmission time and receipt time requiring an adjustment of the output rate without the use of items such as a ReMux or even knowing the exact clock time.

What is claimed is:

1. An apparatus for adjusting a transmission rate of transmitted data, the apparatus comprising:
    a receiving buffer for buffering multi program transport stream (MPTS) packets received at various transmission rates;
    a packet storage for storing null packets;
    a PAT/PMT analyzer for analyzing information of a program association table (PAT) and information of a program map table (PMT) from the received MPTS packets and to output the analyzed information;
    a PID filter section for confirming a relevant program identification information (PID) of the received MPTS packets and for outputting of the confirmed information, and
    a signal processing section for:
        reading data buffered in the receiving buffer at a predetermined output transmission rate,
        stopping said reading of data buffered in the receiving buffer,
        reading and transmitting the null packets stored in the packet storage when a predetermined underflow occurrence forecast situation is determined in the receiving buffer; wherein the signal processing section receives the information output from the PAT/PMT analyzer, confirms PID information of program clock reference (PCR) packets, controls an operation of the PID filter section, and analyzes the PCR information to adjust a buffering size of the receiving buffer.

2. The apparatus according to claim 1, wherein the signal processing section controls transmission of the null packets stored in the packet storage along with data from the receiving buffer to provide a generally constant transmission rate.

3. The apparatus as claimed in claim 1, wherein an output transmission rate, at which the signal processing section reads data buffered in the receiving buffer, is equal to or greater than a transmission rate of the received MPTS packets.

4. The apparatus as claimed in claim 1, wherein data is transmitted according to a moving picture experts group (MPEG) protocol, and the null packets comprise MPEG null packets.

5. The apparatus according to claim 4, wherein the MPEG protocol comprises MPEG-2, and the null packets comprise MPEG-2 null packets.

6. The apparatus according to claim 1, wherein the predetermined underflow occurrence forecast situation in the receiving buffer is adjusted to a size of at least 204.

7. The apparatus according to claim 1, wherein the predetermined underflow occurrence forecast situation in the receiving buffer is adjusted to a size of at least 408 bytes.

8. The apparatus according to claim 1, wherein an input tolerance error of a PCR packet is defined according to an input time period of the PCR packet.

9. A method for adjusting a transmission rate of data, in which multi program transport stream (MPTS) packets inputted at various transmission rates are received and the MPTS data are transmitted at a predetermined output transmission rate, the method comprising the steps of:
    reading and transmitting buffered data at the predetermined output transmission rate when a current buffered data point (CF) reaches a predetermined data output point (HF) in a receiving buffer which receives the input MPST packets;
    confirming a time period between the MPTS packets, adjusting an underflow forecast point (QF) according to the confirmed time;
    stopping the reading of data buffered in the receiving buffer after a transmission of a packet currently in progress is completed and transmitting null packets at the output transmission rate when the current buffered data point (CF) reaches the underflow forecast point (QF) in the process of reading the buffered data; and
    reading and transmitting buffered data at the output transmission rate when the current buffered data point (CF) reaches the data output point (HF) in the process of transmitting the null packets.

10. The method according to claim 9, wherein the data is being transmitted according to a moving picture experts group (MPEG) protocol, and the null packets transmitted in step c) comprise MPEG-null packets.

11. The method according to claim 10, wherein the MPEG protocol comprises MPEG-2 and the null packets comprise MPEG-2 null packets.

12. The method as claimed in claim 11, further comprising:
reading the buffered data to be transmitted at the output transmission rate after a transmission of a null packet currently in progress is completed, when the current buffered data point (CF) reaches the data output point (HF).

13. The method as claimed in claim 9, wherein an input tolerance error of a PCR packet is defined according to an input time period of the PCR packet.

14. The method as claimed in claim 9, wherein said forecast point is lowered when said confirmed time period is large.

15. The apparatus according to claim 1, wherein said predetermined underflow occurrence point in said receiving buffer is determined based on a confirmed time between packets.

16. The apparatus according to claim 15, wherein said predetermined underflow occurrence point in said receiving buffer is lower when said confirmed time is long and higher when said confirmed time is short.

17. The apparatus according to claim 1, wherein said signal processing section starts reading from said receiving buffer when said receiving buffer achieves a known level.

18. The apparatus according to claim 17, wherein said known level represents a mid-point within said buffer.

* * * * *

UNITED STATES PATENT AND TRADEMARK OFFICE
CERTIFICATE OF CORRECTION

PATENT NO. : 7,652,996 B2  Page 1 of 1
APPLICATION NO. : 10/862303
DATED : January 26, 2010
INVENTOR(S) : Kim et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1444 days.

Signed and Sealed this

Twenty-third Day of November, 2010

David J. Kappos
*Director of the United States Patent and Trademark Office*